United States Patent
Philippi et al.

(10) Patent No.: US 8,784,721 B2
(45) Date of Patent: Jul. 22, 2014

(54) METHOD OF MANUFACTURING THREE-DIMENSIONAL OBJECTS BY LASER SINTERING

(75) Inventors: Jochen Philippi, Graefelfing (DE); Thomas Mattes, Gilching (DE)

(73) Assignee: EOS GmbH Electro Optical Systems, Krailling (DE)

( * ) Notice: Subject to any disclaimer, the term of this patent is extended or adjusted under 35 U.S.C. 154(b) by 500 days.

(21) Appl. No.: 12/313,909

(22) Filed: Nov. 25, 2008

(65) Prior Publication Data

US 2009/0152771 A1 Jun. 18, 2009

(30) Foreign Application Priority Data

Nov. 27, 2007 (DE) .......................... 10 2007 056 984

(51) Int. Cl.
| | | |
|---|---|---|
| *B22F 3/105* | (2006.01) | |
| *B22F 3/24* | (2006.01) | |
| *B23K 26/00* | (2014.01) | |
| *B29C 35/08* | (2006.01) | |
| *B29C 41/02* | (2006.01) | |
| *B29C 41/52* | (2006.01) | |
| *G01B 15/08* | (2006.01) | |
| *G01N 25/00* | (2006.01) | |

(52) U.S. Cl.
USPC ................ 264/410; 219/121.83; 219/121.85; 264/497; 374/5; 374/45; 419/26; 419/28

(58) Field of Classification Search
USPC ............ 264/40.1, 113, 410, 497; 219/121.83; 219/121.85; 419/26, 28, 61; 374/5, 45
See application file for complete search history.

(56) References Cited

U.S. PATENT DOCUMENTS

| | | |
|---|---|---|
| 5,460,758 A | 10/1995 | Langer et al. |
| 5,934,805 A * | 8/1999 | Endo et al. .......................... 374/5 |
| 2004/0026807 A1 | 2/2004 | Andersson et al. |
| 2004/0094728 A1* | 5/2004 | Herzog et al. ............ 250/559.06 |
| 2004/0173946 A1 | 9/2004 | Pfeifer et al. |
| 2007/0176312 A1* | 8/2007 | Clark et al. ................ 264/497 X |
| 2008/0131104 A1 | 6/2008 | Philippi |
| 2008/0262659 A1* | 10/2008 | Huskamp ....................... 700/300 |

FOREIGN PATENT DOCUMENTS

| | | |
|---|---|---|
| DE | 141 358 | 4/1980 |
| DE | 41 12 695 | 7/1992 |
| DE | 101 50 633 | 4/2003 |
| DE | 103 10 385 B4 | 9/2006 |
| DE | 10 2005 024 790 A1 | 12/2006 |
| DE | 10 2005 022 308 B4 | 3/2007 |
| DE | 10 2006 009 912 A1 | 9/2007 |

(Continued)

OTHER PUBLICATIONS

Zavgorodny, V.K., Mechanization and Automation of Plastics Processing, *Mashinostroenie*, 1964 pp. 324-325.

(Continued)

*Primary Examiner* — Leo B Tentoni
(74) *Attorney, Agent, or Firm* — Edwards Wildman Palmer LLP (57) ABSTRACT

A method of manufacturing three-dimensional objects by laser sintering is provided, the object is formed by solidifying powder material layer by layer at locations in each layer corresponding to the object by means of laser radiation, wherein an IR-radiation image in an applied powder layer is detected, characterized in that defects and/or geometrical irregularities in the applied powder layer are determined on the basis of the IR-radiation image.

9 Claims, 6 Drawing Sheets

(56) References Cited

FOREIGN PATENT DOCUMENTS

| EP | 1 466 718 A2 | | 10/2004 | |
|----|---|---|---|---|
| EP | 1 296 788 B1 | | 1/2005 | |
| JP | 05060711 A | * | 3/1993 | ............... 374/45 |
| JP | 2003-245981 | | 9/2003 | |
| JP | 2004-306612 | | 11/2004 | |
| RU | 2217265 C2 | | 11/2003 | |

OTHER PUBLICATIONS

Decision to Grant issued Oct. 10, 2012 in corresponding Chinese Patent Application.

* cited by examiner

METHOD OF MANUFACTURING THREE-DIMENSIONAL OBJECTS BY LASER SINTERING

The invention relates to a method of manufacturing three-dimensional objects by laser sintering.

A method of manufacturing three-dimensional objects by use of laser sintering is known from EP 1 466 718 A2, for instance. Here, an infrared camera is used to detect a momentary temperature of a top powder layer. The recorded temperature image is used to re-adjust a radiation heating system by means of a temperature control system. Thereby, undesired shrinking of the top layers of the parts inside the bed can be reduced by the temperature control.

A method of manufacturing three-dimensional objects by melting powder material layers at locations in the respective layer corresponding to the object by means of an electron beamer is known from EP 1 296 788 B1. In order to detect the surface properties of a surface layer in the powder beds, a camera is used which partly measures the temperature distribution of the surface layer and partly detects the occurrence of surface irregularities due to shadow information, which are the results of the surface irregularities. The obtained information about the temperature distribution is used to obtain a temperature distribution at the surface, which is as regular as possible. The shadow information is used to control a deviation between the dimensions of the manufactured object and the target dimensions. Since the camera detects the surface information on the basis of shadow information, a further illumination is necessary to generate such shadow information. The document DE 103 10 385 B4 also describes the use of lateral light incidence by optically observing a powder layer.

Generally, an additional light source is troublesome since an illumination having a large power consumption is necessary in order to cross-fate the heat radiators, which in turn generates waste heat and requires a synchronized flash illumination. Further, the shadow information finally depends on the illumination arrangement. For instance, the generation of a shadow often requires an illumination from various directions. This in turn requires multiple records and a plurality of light sources. However, a recognition of structures is sometimes hardly possible.

Figure 4:
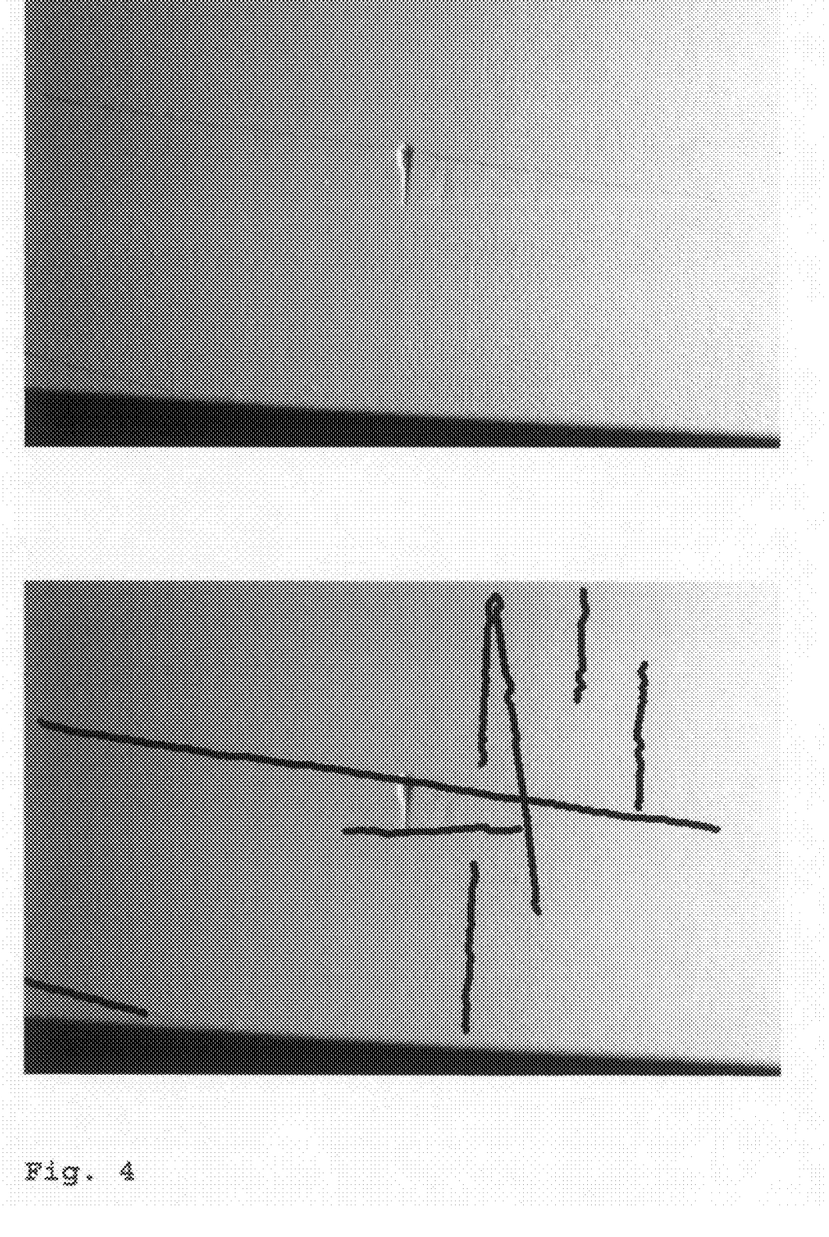
FIG. 4 is an illustration of problems during layer observation in visible light.

FIG. 4 shows in the upper image an example of an applied layer in visible light. In this layer, two artefacts can be recognized. A deep depression in the middle of the image and a wedge-shaped area without any applied layer. The wedge-shaped area extends nearly over the whole width of the image and has a lower edge, which can hardly be recognized. The lower image reveals that an automatic image recognition software is not able to correctly recognize this lower edge. The lower edge can only partly be recognized even by sensitive edge filters. Instead of that, edges will be found due to the high sensitivity, where the layer is actually correct. Therefore, an accurate recognition of the area without applied layer is not possible, so that the defects of the applied layer can not specifically be corrected. It is the object of the invention to provide a method of manufacturing three-dimensional objects by solidifying layers of powder material at the locations of the respective layer corresponding to the object, wherein a quality of the manufactured object is improved.

The invention has an advantage that defects in metering and layering during the manufacturing process are automatically diagnosed and corrected, if necessary. Therefore, a consistent quality control during the manufacturing process is secured.

While the prior art evaluates shadows, the method according to the present invention does not need any additional illumination during observation of the layers. Thereby, the illumination of the machines in visible light is not troublesome. The method does further not depend on the colour and property of the material, and therefore it needs no changes in the conventional structure material by additives.

In a method of the invention, the information about irregularities/defects in the applied powder layer is exclusively acquired on the basis of an IR-radiation image (Infrared-radiation image) of the powder layer. The advantage is used that the infrared radiation from an area does not only depend on the temperature of that area, but also from the degrees of its emission and reflection.

If only the temperature distribution is of interest as in the prior art, it is desirable to compensate the influence of other quantities, i.e. the degrees of emissions and reflections, by corrections. According to the invention, the advantage is used that all three quantities strongly change within the infrared area, when different areas are present in the applied powder. The compensation of influences of the degrees of emissions and reflections does not take place. Due to the high contrast, which is present within the areas having different properties in infrared spectrum, a very accurate layer observation is possible. Even when the temperature throughout a recently applied layer keeps the same, there are, however, differences in the colour of the IR-image. This is because the irregularities in a layer (for instance edges or deviations in the layer thickness) result to different degrees of emissions and reflections.

Further advantages and purposes can be derived from the description of the embodiments on the basis of the Figures.

Figure 1:
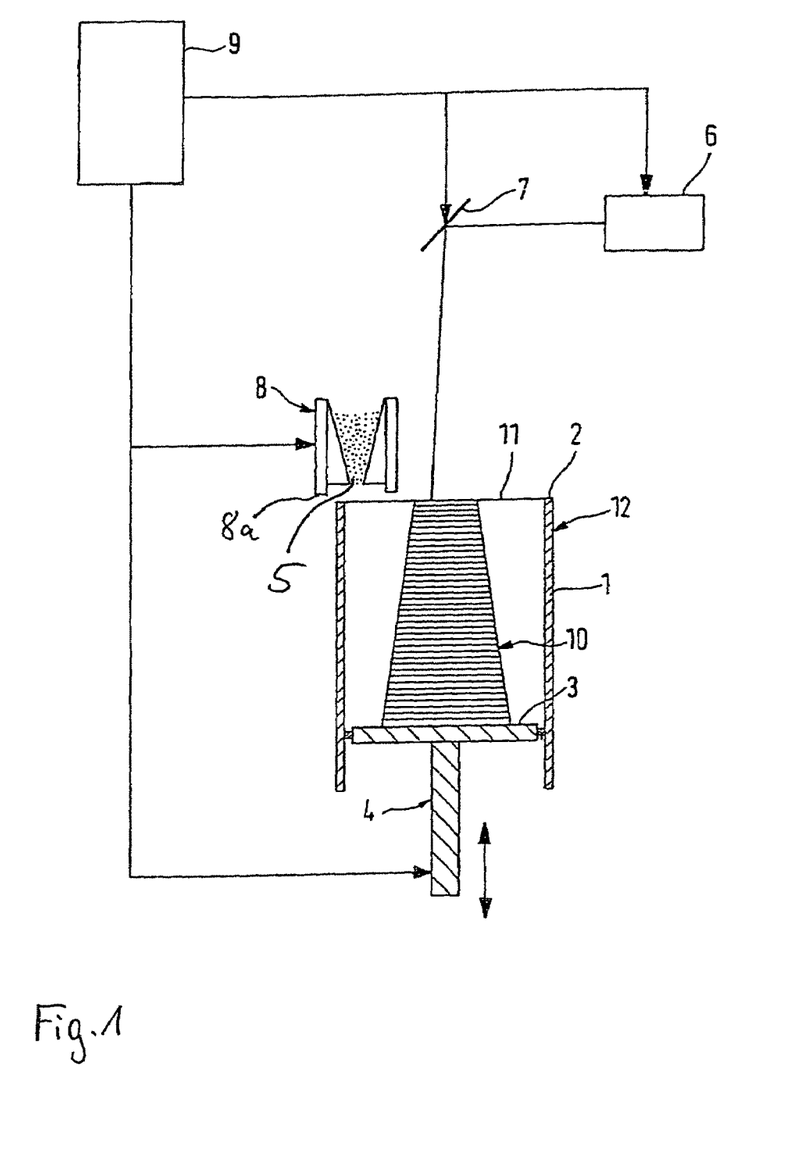
FIG. 1 is a schematic view of a laser sintering device.

As it can be gathered from FIG. 1, the laser sintering device according to the present invention comprises a build-up frame 1 which is open at the upper and the lower sides and comprises an upper circumference 2. Within the build-up frame, there is provided a build-up stage 3, which is connected to a vertical drive 4 for moving the build-up stage 3 up and down in a vertical direction. Above the upper circumference 2, a solidifying means is arranged as a laser 6 and a beam deflection means 7. Further, a layering device 8 for applying powder material is provided. For instance, the layering device includes a container which extends across the build-up area and can be filled up with powder, and it includes a discharge opening 5 at the lower side thereof, which extends across the build-up area. Further, the layering device conventionally includes at least one blade 8a to produce a powder layer having predetermined thickness. The laser 6, the beam deflection device 7, the layering device 8 and the vertical drive 4 are controlled by a control device 9. The depiction of FIG. 1 shows a built-up object 10, which is surrounded by non-solidified material 11. As the powder material, a synthetic powder material is used such as polyamide or polystyrene, for instance. The method according to the present invention is particularly suitable for these materials. However, other materials like metal powder, ceramic powder, fine sand and any other materials can be used, which are suitable for laser sintering.

Figure 2:
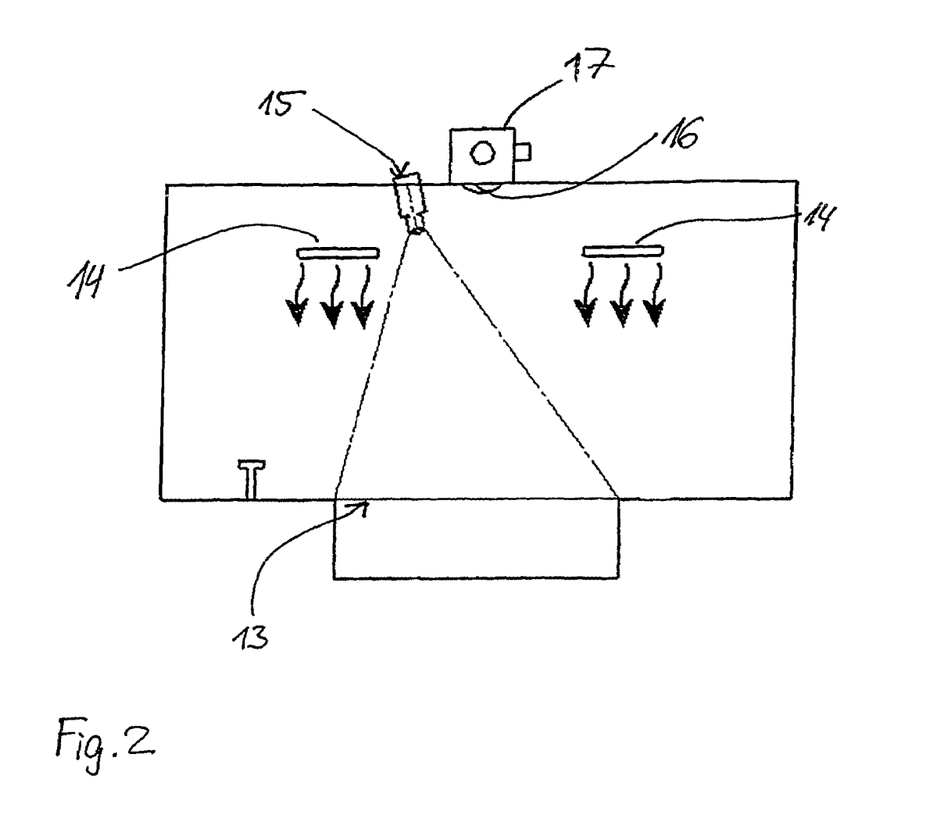
FIG. 2 is a schematic view of an apparatus for observing the layers.

FIG. 2 shows a detail of the construction of the laser sintering device. A newly applied powder layer 13 is provided within the built-up area at the upper circumference 2 of the frame 1. Above the build-up area, radiant heaters 14 are arranged, which are connected to a control device (not shown) and serve to heat up the newly applied powder layer on a working temperature, before illumination with a laser beam takes place. Further, there is provided an infrared camera 15 above the built-up area such that the infrared camera 15 views the whole built-up area. The infrared camera 15 according to the embodiment is sensitive within a range of wavelengths of 1 µm to about 14 µm. Thereby, the infrared camera 15 is suitable for temperatures which occur during laser sintering of synthetic powders. However, the wavelength sensitivity of the camera is selected in accordance to the used material. The infrared camera may be placed either at the side of one of entrance windows 16 for the laser beams or behind the entrance windows at the outside.

According to the method of the present invention, the powder material is applied layer by layer onto the stage 3 and onto a layer, which has been solidified before, and it is solidified by means of the laser beam at locations corresponding to the object. When the layering device 8 is moved over the built-up area and applies a new powder layer, there may occur defects in the newly applied layer, or irregularities may be formed. For instance, the layering device may irregularly apply the powder along the width or the length of the built-up area, so that there is a side where more powder is applied than at another side, and the thickness of the applied powder layer will be changed in the built-up area. Further, one or more trenches may be formed within the applied layer by contaminations of the blade 8a. Further, irregularities may be formed in the newly applied powder layer by rough powder impurities or by solidified areas, for instance, which protrude from the layer level due to heat distortion effects such as curl. These defects and/or irregularities in the newly applied powder layer will be detected based on different temperatures and/or different degrees of emission and/or different degrees of reflection by means of the infrared camera after having applied the powder. At the same time, areas having different layer thicknesses are reproduced by different colours indicating the surface properties of the layer. Hence, each newly applied layer may be observed by image processing of the coloured pictures by comparing the actual values with the target values for each layer. If defects or irregularities are detected, an additional layering step may be performed by the layering device while compensating these irregularities, or instead, the layer parameters for the following layers may be adapted in a manner that the irregularities of the whole formed object have no or substantially no effect at all.

The determination of the IR-beam picture by means of the infrared camera can be performed either at each newly applied layer or only for particular layers by observing particular samples.

Figure 3A:
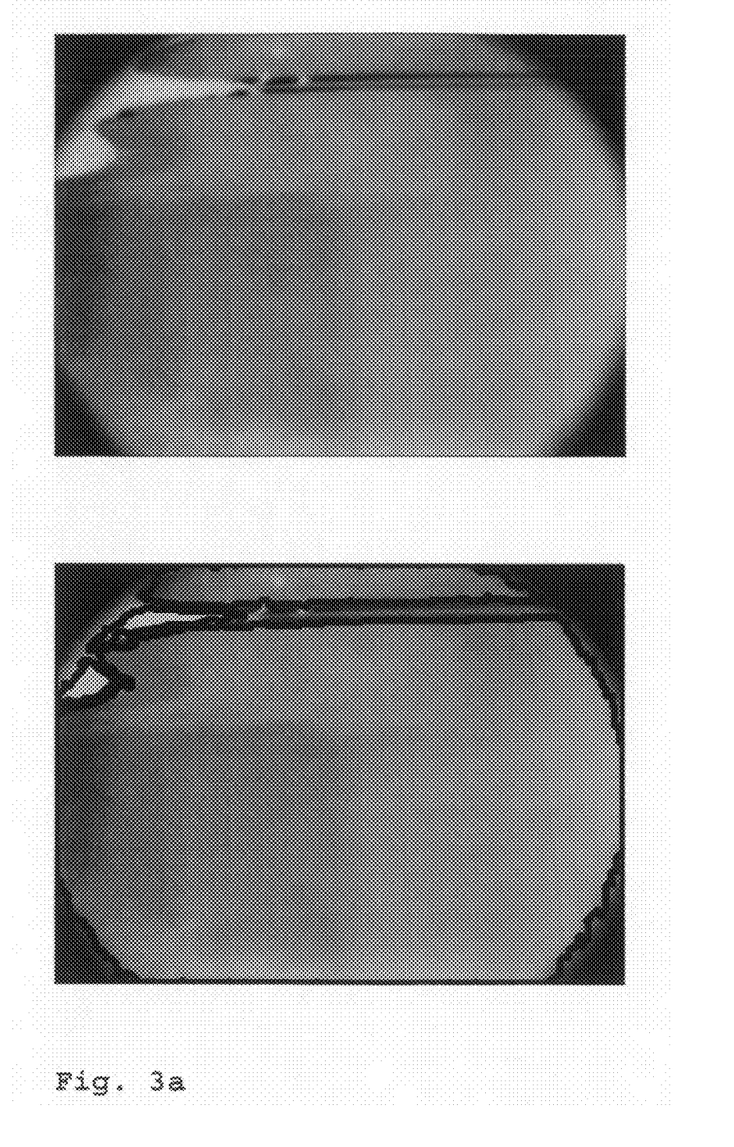
FIG. 3A to 3C are examples of IR-radiation images with defects which may occur during the layering process.
Figure 3B:
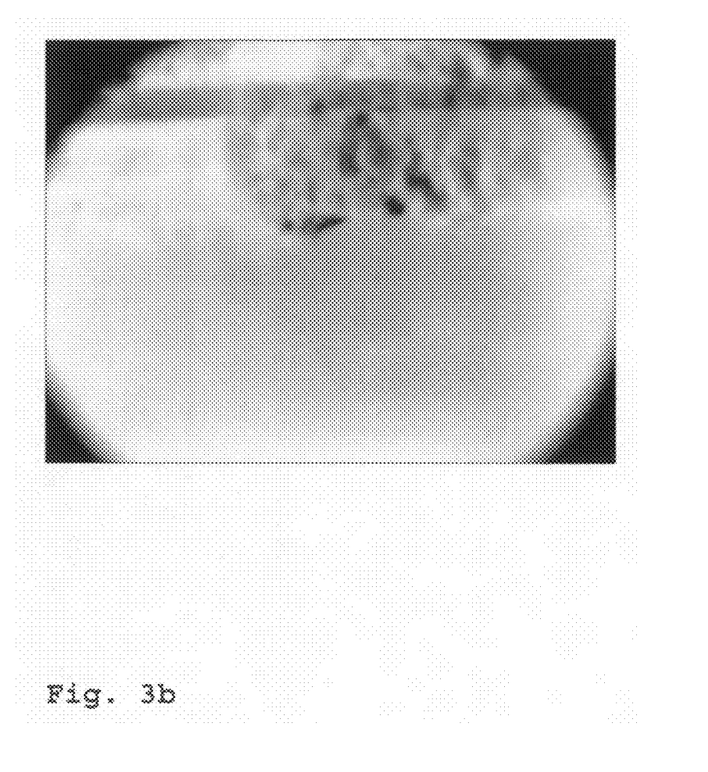
Figure 3C:
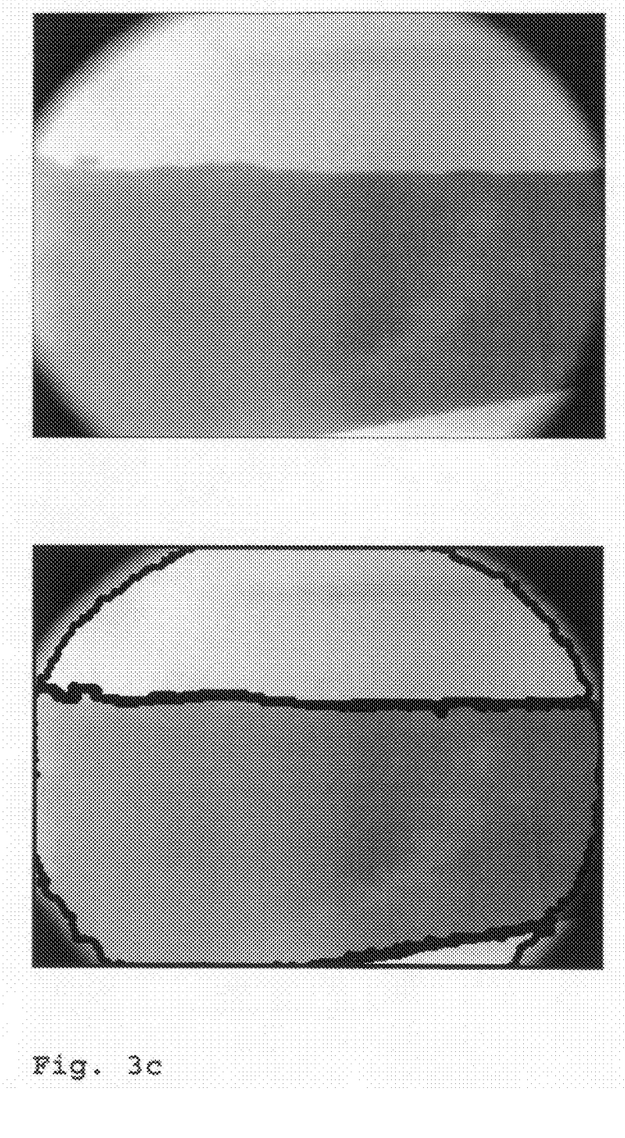

FIGS. 3A to 3C show different IR-beam pictures in case of defects and irregularities. In the case of FIGS. 3A and 3C, the respective IR-beam picture is shown in the upper drawing, and the lower drawing shows the same picture after being processed with a conventional image processing software. According to the present method, the application of a specific image processing method is not relevant. The results of the image processing should merely show, how the method according to the invention results to an improvement by automatically recognition of defects in powder application.

In the IR-beam picture of FIG. 3A, there is a narrow stripe in shape of a trench in the upper part, which results from contaminations adhering on the blade of the layering device. On the basis of the IR-beam picture, the trench can be recognized by the image processing software in the same manner like the bright defects in a part on the left upper side.

FIG. 3B shows a wide stripe resulting from a contamination as well as inhomogeneous layer thicknesses in the right part on the upper side. It is to be noted that the inhomogeneous layer thicknesses are also well recognized in the infrared spectrum, since the applied layer lets the IR-beams pass from the material below the applied layer in variable manner according to the thickness.

FIG. 3C shows discharged powder in the layering device. The layer thickness reduces through the end of the applied layer. While powder still has been applied in the bright upper image area, absence of powder is recognized in the lower image area by a modified colour on the basis of the temperature, which has been increased up to 30° C. The modified colour can be automatically recognized by means of image processing. Even blurred edges do not complicate the recognition of areas, which belong together.

As a further modification, the detected IR-beam image can also be used to regulate the heating power of the radiant heater 14, if inhomogeneous temperatures are detected on the surface of the recently applied powder. As a further modification, unsteady gas curls or streams may be detected by the infrared camera. They shield the heat radiation from the powder bed.

As a further modification, already illuminated areas may be checked in their correct positions of the components. Since the optically measured temperature of the sintered components is higher than that of not sintered powder, the position thereof within the built-up area can be accurately determined within the IR-radiation image.

Observation of the layers by the infrared camera does not need any additional light source. The problem of shadows, which are generated according to the light irradiation, does not occur.

Although the method of laser sintering and the method of laser smelting have been described above, the method according to the present invention may be realized by other methods of selectively applying energy onto a powder layer. For instance, other light sources such as lamps may be used instead of a laser. Further, the energy for solidifying may not only be supplied as electromagnetic radiation, but also as a particle beam such as an electron beam. The method according to the present invention is not influenced as to whether the energy is applied by successively riding over relevant parts of a powder layer by a beam or whether the energy is selectively applied by use of a mask and undirected radiation (such as a silica lamp). Application of a method, where a binder for selectively solidifying of the powder is added, is also possible.

The method is in particularly suitable, when the device of manufacturing three-dimensional objects comprises one or more radiant heaters 14. The reason is, that the recently applied powder layer reflects the heat radiation from the radiant heaters 14 towards the infrared camera 15. Thereby, the ratio of reflected light is higher, which is emitted from the powder layer towards the infrared camera. Thereby, differences in the reflectivity within the layer are further taken into account in addition to the differences in emissivity and temperature, so that the contrast is increased by irregularities, which are present in the layer.

While radiant heaters 14 are present in the device of manufacturing three-dimensional objects, the accuracy of the method according to the present invention may be improved, when surface beamers as radiant heaters 14 are arranged in a preferred manner. Such surface beamers are described in DE 10 2005 024 791 A1, for instance. Compared with the use of silicate tube beamers, the use of such surface beamers has advantages in the method according to the present invention, since a homogenous irradiation of the applied powder layer is enabled. Thereby, the detected differences in the reflectivity of the layer is not interfered by inhomogeneous irradiation.

The invention claimed is:

1. A method of manufacturing three-dimensional objects, the method comprising:
    forming an object by solidifying powder material layer by layer at locations in each layer corresponding to the object,
    detecting locally emitted IR-radiation from an applied powder layer to obtain an IR-radiation image, and
    determining defects and/or geometrical irregularities of the applied powder layer on the basis of the IR-radiation image, based on different degrees of emissions and/or reflections,
    further comprising applying electromagnetic radiation or particle radiation to solidify the layer at locations corresponding to the object,
    further comprising correcting the defects and/or the geometrical irregularities (i) by applying a second correcting layer or (ii) in the course of a building process of the object.

2. The method according to claim 1, further comprising, during or after the solidification step for a layer, evaluating the completeness and correct position of the solidified areas of said layer.

3. The method according to claim 1, further comprising determining the presence of unsteady gas curls or streams on the basis of the measured IR-radiation image.

4. The method according to claim 1, further comprising setting a newly applied powder layer on a working temperature by heat radiation or by another energy supply.

5. The method according to claim 4, further comprising detecting the IR-radiation image of the newly applied layer during a heat-up time, and regulating a heating power when an inhomogenity is present.

6. The method according to claim 4, further comprising performing the heat-up process by surface radiators.

7. The method according to claim 1, further comprising detecting the IR-radiation image by means of an infrared camera.

8. The method according to claim 1, further comprising using a synthetic powder for the applied powder.

9. The method according to claim 8, wherein the synthetic powder comprises a material selected from a polyamide, a polystyrene or a metal powder.

* * * * *